United States Patent [19]
Kroneis et al.

[11] Patent Number: 5,527,706
[45] Date of Patent: Jun. 18, 1996

[54] METHOD FOR MIXING TWO INITIAL SOLUTIONS

[75] Inventors: Herbert Kroneis; Taghi Noormofidi; Wolf-Dietrich Steinböck; Herfried Huemer, all of Graz, Austria

[73] Assignee: AVL Medical Instruments AG, Schaffhausen, Switzerland

[21] Appl. No.: 321,791

[22] Filed: Oct. 12, 1994

[30] Foreign Application Priority Data

Oct. 21, 1993 [AT] Austria ................... 2131/93

[51] Int. Cl.⁶ .................................. G01N 31/00
[52] U.S. Cl. .................. 436/55; 436/8; 436/17; 436/50; 422/100; 435/967; 73/1 R
[58] Field of Search ................ 436/43, 50, 52, 436/55, 56, 8, 17, 19, 179; 435/967; 422/63, 67, 81, 52, 82.01, 82.02, 82.05, 82.08, 100; 364/497, 500; 73/1 R

[56] References Cited

U.S. PATENT DOCUMENTS

| | | | |
|---|---|---|---|
| 3,791,793 | 2/1974 | Friedmann et al. | 436/55 |
| 4,119,406 | 10/1978 | Clemens | 422/81 |
| 4,239,493 | 12/1980 | Niemi et al. | 436/55 |
| 4,794,806 | 1/1989 | Nicoli et al. | 73/863.01 |
| 4,873,057 | 10/1989 | Robertson et al. | 422/75 |
| 4,906,580 | 3/1990 | Meserole | 436/56 |
| 5,185,263 | 2/1993 | Kroneis et al. | 436/8 |
| 5,204,264 | 4/1993 | Kaminer | 436/8 |
| 5,204,266 | 4/1993 | Calzi | 436/11 |
| 5,306,391 | 4/1994 | Cirucci et al. | 162/49 |
| 5,389,524 | 2/1995 | Larsen et al. | 435/29 |

FOREIGN PATENT DOCUMENTS 392364 3/1991 Austria.

*Primary Examiner*—Jeffrey R. Snay
*Assistant Examiner*—Long V. Le
*Attorney, Agent, or Firm*—Watson Cole Stevens Davis

[57] ABSTRACT

In a process for mixing two initial solutions to produce a working solution with an accurately defined mixing ratio, the two initial solutions are coarsely mixed in a first step, having a mixing ratio lying within a given range, and the value of an internal parameter of the working solution is determined in a second step. The values of this internal parameter are known and differ significantly for the two initial solutions. Then the accurate mixing ratio of the working solution is determined from the measured value of the internal parameter in a third step.

9 Claims, 1 Drawing Sheet

METHOD FOR MIXING TWO INITIAL SOLUTIONS

BACKGROUND OF THE INVENTION

The invention relates to a method for mixing two initial solutions to produce a working solution with an accurately known mixing ratio, and a calibrating device for implementing this method.

Accurate mixtures of liquids are often produced with the use of expensive dilutor systems. Such systems permit the required mixing ratios to be obtained in an exactly reproducible manner.

In various applications, however, the required mixtures need not have an accurately defined mixing ratio; sometimes exact knowledge of the actual mixing ratio obtained will suffice. In those instances the use of expensive mixing systems is superfluous.

DESCRIPTION OF THE PRIOR ART

An improvement of known systems is presented in AT-B 392 364, which describes a method for calibrating a measuring device and an apparatus for implementation of the method. In order to calibrate a measuring device, which is used for determining at least the pH and $pCO_2$ values in aqueous solutions, it is proposed that two aqueous parent solutions of good storage stability, A and B, be mixed together at a defined ratio just before calibration, and that the desired pH and $pCO_2$ values be made available for calibration of the respective measuring electrodes of the device only after chemical reaction of the parent solutions A and B has occurred. To determine the accurate mixing ratio it is suggested that a coloring agent be added to one of the parent solutions A or B, and that the mixing ratio of the working solution be determined by means of optical methods, for example, absorption measurements. The document also indicates that it would be possible to add other chemical or physical markers to at least one of the parent solutions, for instance fluorescence quenchers, or radioactively tagged substances.

This method suffers from the drawback that certain substances must be added to one of the parent solutions. In addition to making the process more complicated, this measure also has the effect that the substances added to the parent solution will then be contained in the working solution where they might interfere with the planned use of the solution.

SUMMARY OF THE INVENTION

It is an object of the invention to improve a mixing process as described above in such a way as to ensure simplicity of use while largely avoiding contaminants in the working solution.

In the invention this object is achieved by coarsely mixing the two initial solutions in a first step, the mixing ratio lying within a given range, and by determining the value of an internal parameter of the working solution in a second step, the values of this parameter being known and differing significantly for the two initial solutions, and by determining the exact mixing ratio of the working solution from the measured value of the internal parameter in a third step. The fundamental idea of the invention is that the mixing ratio should be determined with the use of a variable or parameter which is a priori present or inherent in the initial solutions, or at least in one of these solutions. In this way the new method will make superfluous the use of expensive precision equipment for mixing the solutions and the addition of markers.

The method of the invention essentially comprises two processes: coarse mixing of the initial solutions and precise measuring of the mixing ratio with the use of an internal parameter.

Particularly good results are obtained if the value measured for the internal parameter is employed as a controlling or adjusting variable for correcting the mixing ratio during coarse mixing, as is proposed in further development of the invention. As a consequence, the mixing ratio may be controlled or adjusted by a feedback of the internal parameter.

In further development of the invention it is proposed that for calibrating purposes the working solution be a calibrating solution with at least one calibrating parameter, the exact value of the calibrating parameter being calculated from the measured value of the internal parameter, and at least one variable from the group of pH value and $CO_2$ partial pressure of the calibrating solution being used as calibrating parameter.

The method of the invention is particularly useful in the calibrating of ion-selective electrodes by providing that at least one ionic concentration of the calibrating solution be employed as calibrating parameter, i.e., preferably the concentration of $Na^+$, $K^+$, $Li^+$, $Ca^{++}$, $Mg^{++}$, $Cl^-$ or $HCO_3^-$ ions.

It is further provided for the calibration of biosensors that at least one enzyme substrate concentration of the calibrating solution be employed as calibrating parameter, i.e., preferably the concentration of glucose, lactate, urea, or creatinine.

In the invention the internal parameter to be measured may be conductivity, electrical resistance, optical transmission, optical absorption, or intrinsic luminescence of the working solution. Conductivity is measured without the use of special markers, i.e., no conductive additive is required for the solutions. As all organic buffer systems exhibit intrinsic luminescence, for instance, luminescence may be measured in application of the invention.

In the instance of ions and $CO_2$ and pH, the relationship between conductivity and the calibrating parameter is trivial, as all ions contribute towards conductivity. With enzyme substrates a correlation with conductivity is established, for example, if the calibrating solutions are used in buffered pH environment, and if each pH buffer system is conductive on account of the dissociation equilibria.

If conductivity is used as an internal parameter the method of the invention may be employed for all calibrating solutions with a pH buffer system. The two buffer components, buffer acid and buffer base are used separately in the two initial solutions, for example as described in AT-B 392 364.

It is also possible to combine the above calibrating parameters as required, which is desirable, for instance, in an analyzer for measurement of blood gases, electrolytes or enzyme substrates, or a combination thereof.

The internal parameter must be measurable over the entire mixing range including the limiting values of the initial solutions, and the functional relationship between measured value of the internal parameter and mixing ratio of the working solution must be known.

The above method is particularly well suited for integration into a calibrating system for analyzers with a measuring chamber, which measuring chamber is provided with a device for measurement of the conductivity of sample and calibrating solutions delivered into the measuring chamber by means of a pump.

It is provided by the invention that the calibrating system comprise two containers with different initial solutions, where controlled valves are provided for coarse mixing of the initial solutions to produce a working solution in a passage, and where the passage may be connected to the device for conductivity measurement, and where an evaluation unit is provided for calculation of the exact mixing ratio of the initial solutions from the value measured for conductivity.

Such a calibrating system is particularly useful in analyzers for the measurement of blood gases, electrolytes and/or enzyme substrates.

Following is a more detailed description Of the mixing process as illustrated by examples and supported by FIGS. 1 to 4 of the accompanying drawings.

DETAILED DESCRIPTION OF THE INVENTION

The following procedures for coarse mixing (item A) and ratio measurement (item B) may be combined as required in a mixing system for implementing the method of the invention.

A) Low-cost Methods for Coarse Mixing of Initial Solutions

Figure 1:
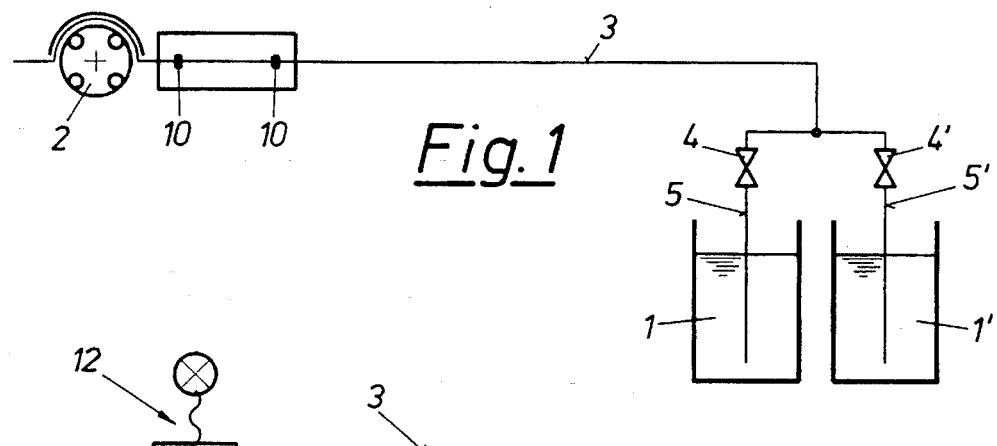
FIG. 1 shows a mixing system employing a single-channel pump system.

In FIG. 1 two initial solutions in containers 1 and 1' are fed alternatingly into a common passage 3 by means of a single-channel pump 2 to produce a working solution, the resulting mixture being homogenized in passage 3. The mixing ratio is determined within certain limits via the ratio of the opening times of valves 4, 4' in the suction lines 5, 5' of the initial solutions.

Figure 2:
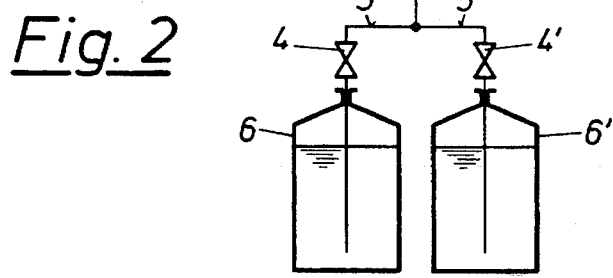
FIG. 2 shows a mixing system employing a pressure cylinder system.

In FIG. 2 fractions of the two initial solutions in cylinders 6, 6' are metered and dispensed at a given pressure into a common passage 3, by means of valves 4, 4'. The mixing ratio is again predefined within certain limits via the ratio of the opening times of valves 4, 4'.

Figure 3:
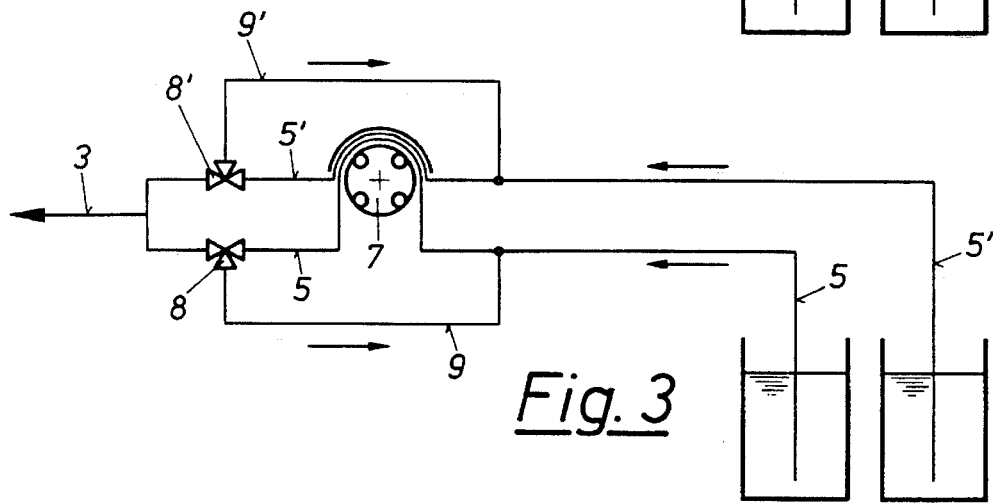
FIG. 3 shows a mixing system employing a multi-channel pump system.

In the variant of FIG. 3 the initial solutions are delivered from their containers 1, 1' in a given ratio via the pump channels of a multi-channel pump 7. By joining the lines 5, 5' into one common line behind the pump 7 the initial solutions delivered are thus combined in correspondence with the ratio of the channel delivery rates. In order to permit optional delivery of one of the two initial solutions in its unmixed state into passage 3 for the purpose of caluration, bypass channels 9, 9' with valves 8, 8' are provided.

B) Methods for Precise Determination of the Mixing Ratio

Generally speaking, determination of the mixing ratio must be more accurate than the required accuracy of the mixture. In addition, for determination of the mixing ratio an internal parameter must be evaluated in which the two initial solutions differ significantly. The measuring apparatus may be installed either at the site where the mixture is processed or in the path towards the consumer of the working solution. Calibration of the mixing system is performed by measuring the unmixed initial solution.

FIG. 1 is concerned with ratio determination via conductivity measurement or measurement of electrical resistance, which may be performed on initial solutions whose values for conductivity or electrical resistance differ. As there is an (approximately linear) mathematical relationship between mixing ratio and conductivity or electrical resistance, the actual mixing ratio may be accurately calculated from a measurement of conductivity or resistance by means of a suitable device 10.

As is shown in FIG. 2, the optical transmission or absorption, which is different for each initial solution, may be measured by a (schematically drawn) light detection unit 12 and used for determination of the mixing ratio. In the light of one of the requirements of the invention, i.e., no use of external markers, this method is suitable for use with initial solutions whose colors are a priori different.

Figure 4:
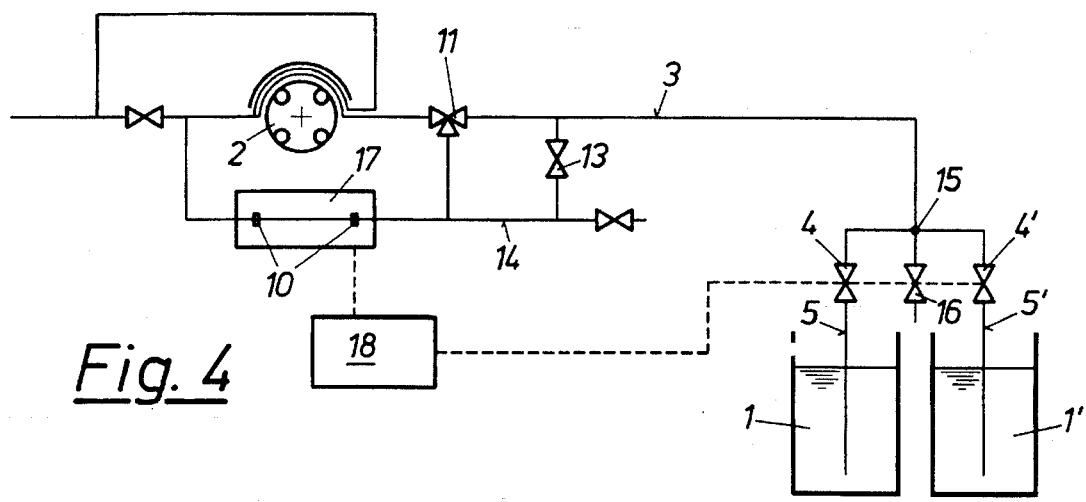
FIG. 4 shows a mixing system for use in the calibrating system of a blood gas analyzer.

FIG. 4 shows a favorable application of the method in the calibrating system of an analyzer (not shown here) measuring blood gases, electrolytes or enzyme substrates, or a combination thereof, in which a single-channel pump system 2 is combined with a device 10 for conductivity measurement (cf. FIG. 1).

For the calibration of such an analyzer solutions with specific gas partial pressures are required. As such solutions have no storage stability they are prepared immediately before use by mixing two initial solutions. It is not necessary to produce an accurate mixing ratio; knowledge of the actual mixing ratio obtained and thus the concentrations and partial pressures of the substances required for calibration will suffice.

For optimum integration into the analyzer the analyzer pump, which is configured as a single-channel pump 2, is connected to passage 3 of the mixing system via a valve 11. The working mixture contained in passage 3 upon mixing is drained via a connection 14 switched by a valve 13. After they have passed the timed valves 4, 4' the initial solutions are combined in a crosspiece 15. If necessary, passage 3 is vented by valve 16.

If the system is integrated in an automatic analyzer as described, the accurate mixing ratio to be measured in an evaluation unit 18 is best determined by a conductivity measurement for the following reasons:

Contacts provided for conductivity measurement in measuring chamber 17 may also be used for the guiding and positioning of samples;

Analysis of the working mixture is performed in a measuring chamber 17 which is thermostat-controlled for several reasons;

In the above analyzer, the two initial solutions are characterized by a significant difference in conductivity values, even if no special provisions are made.

The mixing ratio may therefore be accurately determined "on site", i.e., where the working solution or the calibrating solution is actually processed in the measuring chamber.

An automatic analyzer for use with the system of the invention requires only the following additional elements: the mixer valves 4, 4', the two valves 11 and 13 for connection of the device to the blood gas analyzer, and, optionally, a venting valve 16. The following elements are needed for operation of the analyzer itself, their use in the system for mixing the initial solutions being an additional application: the pump 2 and the device 10 for conductivity measurement located in the sample or measuring chamber 17.

Another advantage of the calibrating procedure described above is that any number of calibration points and calibration ranges are obtainable with the use of the same initial solutions.

The calibration of automatic clinical analyzers is usually adjusted to physiological standard values or expected values. By means of the process of the invention additional calibration points may easily be established outside the normal ranges. In the case of extremely pathological sample values, for instance, an additional calibrating point in the corresponding range would be useful for a correct analysis.

Some automatic analyzers are suitable for measuring identical parameters in different body fluids whose normal ranges of these parameters may be completely different. An example would be electrolyte analysis using ion-selective electrodes in whole blood, serum, or plasma on the one side, and in urine on the other side. In urine samples the expected values for $Na^+$, $K^+$, and $Cl^-$ have normal ranges which are completely different from those in the other three sample types. Once again, the procedure described above will permit calibrating values to be obtained in accordance with the corresponding normal range of the sample without having to exchange the initial solutions.

We claim:

1. A method for providing a calibrating solution having an accurately known value of a predetermined calibrating parameter from first and second initial solutions which each exhibit a predetermined inherent parameter but to a differing degree, said method consisting of the steps of (a) coarsely mixing said first and second initial solutions at a miming ratio within a predetermined range to obtain a calibrating solution, (b) measuring the value of said predetermined inherent parameter of said first and second initial solutions in said calibrating solution to determine the exact ratio of said first and second initial solutions in said calibrating solution, and (c) determining an exact value of said calibrating parameter of said calibrating solution from said exact ratio of said first and second initial solutions in said calibrating solution determined in step (b).

2. A method according to claim 1, including the step of using said value for said inherent parameter determined in step (b) as a controlling or adjusting variable for correcting said mixing ratio in step (a).

3. A method according to claim 1, wherein said calibrating parameter is at least one variable from a group consisting of pH value and $CO_2$ partial pressure of said calibrating solution.

4. A method according to claim 1, wherein said calibrating parameter is at least one ionic concentration of a group consisting of $Na^+$, $K^+$, $Li^+$, $Ca^{++}$, $Mg^{++}$, $Cl^-$ and $HCO_3^-$ of said calibrating solution.

5. A method according to claim 3, wherein said calibrating parameter is at least one ionic concentration of a group consisting of $Na^+$, $K^+$, $Li^+$, $Ca^{++}$, $Mg^{++}$, $Cl^-$ and $HCO_3^-$ of said calibrating solution.

6. A method according to claim 1, wherein said calibrating parameter is at least one enzyme substrate concentration of a group consisting of glucose, lactate, urea, and creatinine of said calibrating solution.

7. A method according to claim 5, wherein said calibrating parameter is at least one enzyme substrate concentration of a group consisting of glucose, lactate, urea, and creatinine of said calibrating solution.

8. A method according to claim 1, wherein said inherent parameter is conductivity or electrical resistance of said calibrating solution.

9. A method according to claim 1, wherein said inherent parameter is at least one of optical transmission, optical absorption, and intrinsic luminescence of said calibrating solution.

* * * * *